United States Patent
Kitaura (10) Patent No.: US 7,868,685 B2
(45) Date of Patent: Jan. 11, 2011

(54) ELECTRONIC CIRCUIT DEVICE OPERABLE UNDER POWER SUPPLY

(75) Inventor: Tomoyasu Kitaura, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 18 days.

(21) Appl. No.: 12/340,718

(22) Filed: Dec. 21, 2008

(65) Prior Publication Data

US 2010/0156503 A1 Jun. 24, 2010

(30) Foreign Application Priority Data

Dec. 21, 2007 (JP) ............................. 2007-330245

(51) Int. Cl.
*G05F 1/10* (2006.01)
(52) U.S. Cl. ...................... 327/538; 327/540; 327/541; 327/544
(58) Field of Classification Search ................. 327/538, 327/540, 541, 544
See application file for complete search history.

(56) References Cited

U.S. PATENT DOCUMENTS 5,457,421 A * 10/1995 Tanabe ....................... 327/530
6,107,700 A * 8/2000 Ishikawa et al. ............. 307/116
6,919,757 B2 * 7/2005 Sakurai ....................... 327/541
6,930,539 B2 * 8/2005 Erckert ....................... 327/540
7,414,457 B2 * 8/2008 Ogawa et al. ................ 327/538

FOREIGN PATENT DOCUMENTS

JP 2001-358294 A 12/2001
JP 2004-327820 A 11/2004

* cited by examiner

*Primary Examiner*—Kenneth B. Wells
(74) *Attorney, Agent, or Firm*—Fujitsu Patent Center

(57) ABSTRACT

An electric circuit device operable under a power supply includes: a circuit; a first switch connected between the power supply and the circuit; a capacitor tending to produce a first leakage current; a second switch connected between the power supply and the capacitor, the second switch producing a second leakage current when it is cut off, the second leakage current being less than the first leakage current; and a switch controller for turning on the second switch while both the first switch and the second switch are turned off, and after a first time passes for turning on the first switch.

6 Claims, 7 Drawing Sheets

FIG.3A

| C | A | B |
|---|---|---|
| c1 | ON | ON |
| c2 | SLEEP | SLEEP |
| c3 | SLEEP | OFF |
| c4 | ON | OFF |
| c5 | OFF | OFF |

FIG.3B

| A | 110 | 112 |
|---|---|---|
| ON | 1 | 1 |
| SLEEP | 0 | 1 |
| OFF | 0 | 0 |

FIG.3C

| B | 120 | 122 |
|---|---|---|
| ON | 1 | 1 |
| SLEEP | 0 | 1 |
| OFF | 0 | 0 |

ELECTRONIC CIRCUIT DEVICE OPERABLE UNDER POWER SUPPLY

CROSS-REFERENCE TO RELATED APPLICATION

This application is based upon and claims the benefit of priority of the prior Japanese Patent Application No. 2007-330245 filed on Dec. 21, 2007, the entire contents of which are incorporated herein by reference.

BACKGROUND

1. Field

This art is related to an electronic circuit device for controlling a switch which connects a circuit to a power supply.

2. Description of the Related Art

As one of functions for reducing the power consumption of a semiconductor integrated circuit used in an electronic device, there is a power shut-off function. The power shut-off function stops the power supply to a circuit of a predetermined block constituting an electronic circuit device such as a semiconductor integrated circuit. The function can reduce unnecessary power consumption in the standby state of the circuit and increase the time of continuous operation of the electronic device. To stabilize the operation of the circuit, the circuit is normally connected in parallel to a capacitive element for stabilizing a power supply voltage. If the connection between the circuit and the power supply is interrupted, the connection between the capacitive element and the power supply is also simultaneously interrupted. Meanwhile, the circuit and the capacitive element are constantly connected to each other. Thus, if the connection of the circuit to the power supply is interrupted, the capacitive element is discharged by the circuit. When the circuit is reconnected to the power supply, therefore, the capacitive element needs to be charged. This phenomenon causes a delay in the activation of the circuit.

As conventional techniques, there are techniques disclosed in Japanese Unexamined Patent Application Publication Nos. 2001-358294 and 2004-327820. The technique of the former publication turns off a switch connected in series to a capacitive element to prevent the charged capacitive element from being discharged. The technique of the latter publication turns off a switch connected in series to a MOS (Metal Oxide Semiconductor) capacitor to prevent gate leakage caused by the MOS capacitor.

SUMMARY

According to an aspect of an embodiment, an electric circuit device operable under a power supply includes: a circuit; a first switch connected between the power supply and the circuit; a capacitor tending to produce a first leakage current; a second switch connected between the power supply and the capacitor, the second switch producing a second leakage current when it is cut off, the second leakage current being less than the first leakage current; and a switch controller for turning on the second switch while both the first switch and the second switch are turned off, and after a first time passes for turning on the first switch.

DESCRIPTION OF THE PREFERRED EMBODIMENTS

Description will be made below of embodiments of the present invention. The present invention is not limited to the embodiments described below.

Figure 1:
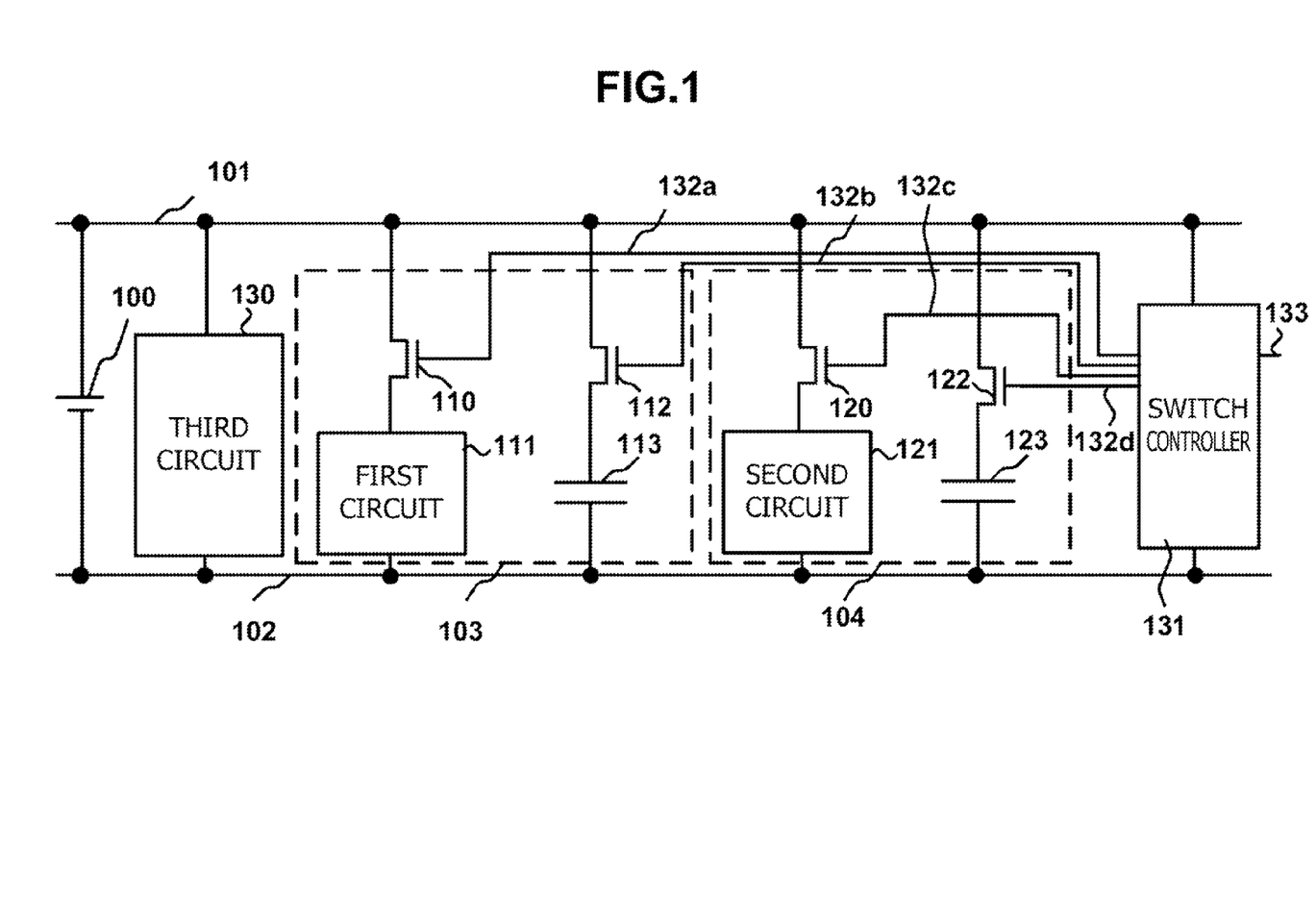
FIG. 1 shows an overall configuration diagram.

FIG. 1 shows a configuration diagram of a semiconductor device including an electronic circuit device according to one of the present embodiments. The semiconductor device includes a power supply line 101, a reference potential line 102, a third circuit 130, a block 103, a block 104, and a switch controller 131. The blocks 103 and 104 and the third circuit 130 are supplied with a power supply voltage from a power supply 100 via the power supply line 101. The switch controller 131 is formed by a PMU (Power Management Unit), for example. Detailed description of the switch controller 131 will be made with reference to FIG. 2. The electronic circuit device includes a plurality of blocks. In the present embodiment, the electronic circuit device includes two blocks.

The third circuit 130 is a logic circuit constantly connected to the power supply line 101 and the reference potential line 102. Meanwhile, the blocks 103 and 104 are connected to the power supply line 101 on the basis of switch control signals 132a, 132b, 132c, and 132d transmitted from the switch controller 131. The block 103 includes a switch 110, a first circuit 111, a switch 112, and a capacitive element 113. The switch 110 turns on and off the connection between the first circuit 111 and the power supply line 101. The switch 112 turns on and off the connection between the capacitive element 113 and the power supply line 101. The switches 110 and 112 are controlled by switch control signals 132a and 132b, respectively, which are output from the switch controller 131. The capacitive element 113 is for stabilizing the level of the power supply voltage supplied to the first circuit 111.

The block 104 includes a switch 120, a second circuit 121, a switch 122, and a capacitive element 123. The switch 120 turns on and off the connection between the second circuit 121 and the power supply line 101. The switch 122 turns on and off the connection between the capacitive element 123 and the power supply line 101. The switches 120 and 122 are controlled by switch control signals 132c and 132d, respectively, which are output from the switch controller 131. The capacitive element 123 is for stabilizing the level of the power supply voltage supplied to the second circuit 121.

The switch controller 131 outputs the switch control signals 132a, 132b, 132c, and 132d on the basis of a state transition signal 133 which determines the next operational state of each of the blocks. The state transition signal 133 is a signal transmitted from a not-illustrated microcomputer. On the basis of the state transition signal 133, the switch controller 131 determines which block is to be transited to which operation mode. The switch controller 131 transmits to each of the switches the switch control signals 132a, 132b, 132c, and 132d according to the determined operation mode.

The switches 112 and 122 are provided to prevent current consumption by the leakage current of the capacitive elements 113 and 123. Therefore, the off-state leakage current of each of the switches 112 and 122 needs to be less than the leakage current of the corresponding one of the capacitive elements 113 and 123. When each of the capacitive elements 113 and 123 is formed by a MOS capacitor, a large capacitance value can be ensured by reduction in thickness of an oxide film formed between the gate and the drain of the MOS capacitor. Meanwhile, the reduction in thickness of the oxide film results in an increase in the leakage current. Therefore, when each of the switches 112 and 122 is formed by a MOS transistor, for example, if the oxide film of each of the switches 112 and 122 is made thickener than the oxide film of the corresponding one of the capacitive elements 113 and 123, the off-state leakage current of the switch can be made less than the leakage current of the capacitive element. According to the present embodiment, therefore, the capacitive element 113 or 123 has been charged when the first circuit 111 or the second circuit 121 is connected to the power supply 100. As a result, a voltage drop occurring when the first circuit 111 or the second circuit 121 is connected to the power supply 100 can be prevented. Accordingly, the first circuit 111 or the second circuit 121 can be activated at high speed.

Figure 2:
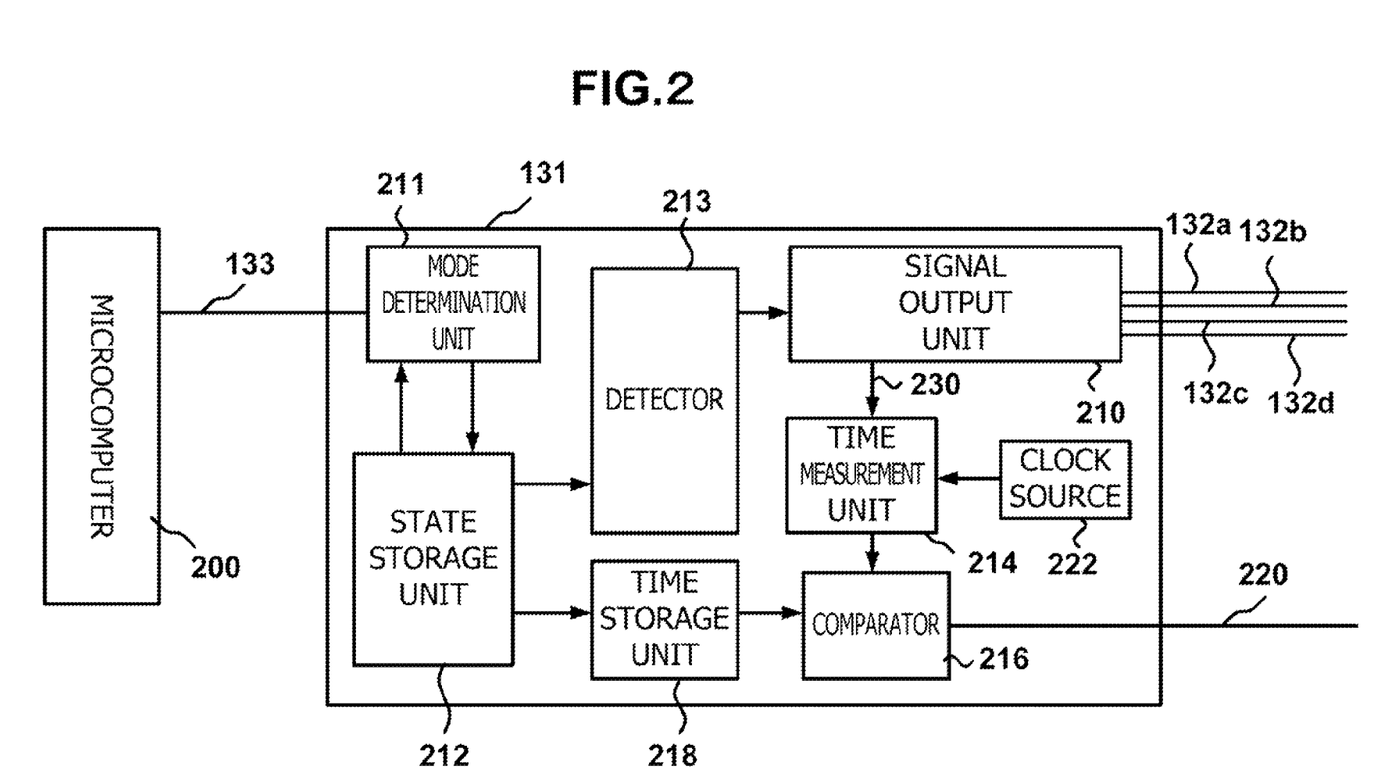
FIG. 2 shows a configuration diagram of a switch controller.

FIG. 2 is a functional block diagram for explaining the switch controller 131. The switch controller 131 is constituted by a signal output unit 210, a mode determination unit 211, a state storage unit 212, a decoder 213, a time measurement unit 214, a comparator 216, a clock source 222, and a time storage unit 218.

The switch controller 131 receives the state transition signal 133 from an external device of a microcomputer 200, and starts a process of determining the next operation mode. The switch controller 131 determines the next operation mode on the basis of the state transition signal 133 input therein, and outputs the result of the determination as the switch control signals 132a, 132b, 132c, and 132d.

The state storage unit 212 stores the current operation mode. The mode determination unit 211 stores a correspondence table of the next operation mode determined by the combination of the current operation mode and the state transition signal 133. With the use of the state transition signal 133 input from the microcomputer 200 and the current operation mode stored in the state storage unit 212, and on the basis of the correspondence table described later, the mode determination unit 211 performs a process of determining the next operation mode. The next operation mode determined by the mode determination unit 211 is stored in the state storage unit 212. Each operation mode is defined as a binary number including a plurality of bits. Further, if the operation mode is stored in the state storage unit 212 as a nonvolatile memory, and if the operation mode is used at the time of activation, the state of the switch controller 131 at the time of activation can be determined.

The state storage unit 212 stores the current operation mode and the next operation mode. On the basis of the two operation modes, the time storage unit 218 described later determines the number of counts output to the comparator 216.

The state storage unit 212 outputs an operation mode signal of the next operation mode to the decoder 213 and the time storage unit 218. The decoder 213 decodes the input operation mode signal into an operation mode signal for each of the blocks 103 and 104, and outputs the decoded operation mode signal to the signal output unit 210. The signal output unit 210 decodes the input operation mode signal into the switch control signals 132a, 132b, 132c, and 132d, and outputs the decoded switch control signals 132a, 132b, 132c, and 132d. Further, upon receipt of the operation mode signal, the signal output unit 210 outputs a count start signal 230. The time storage unit 218 stores the time required to charge each of the capacitive elements 113 and 123 and so forth, as time information in the number of counts of a clock signal, for example.

The number of counts is determined on the basis of the clock period of the clock source 222. The time storage unit 218 further stores a correspondence table of the change of the operation mode and the capacitive element to be charged according to the change. The time storage unit 218 outputs to the comparator 216 the number of counts corresponding to the current operation mode and the next operation mode input therein.

The relationship between the number of counts stored in the time storage unit 218 and the capacitance value of the capacitive element is defined as follows, for example. If the capacitance value of the capacitive element is represented as C, and if the on-resistance value at the turn-on of the switch which connects the capacitive element to the power supply is represented as R, a charging time t for charging the capacitive element is determined as $t=C \times R$. The time t is time constant. Therefore, if the clock period of the clock source 222 supplied to a counter is represented as T, the number of counts N corresponding to the charging time t of the capacitive element can be obtained as $N=t \div T$.

The time measurement unit 214 measures the time elapsed since the receipt of the count start signal 230, and records the result of the measurement as time information. The time measurement unit 214 can be formed by a counter, for example. The time measurement unit 214 receives the count start signal 230 output from the signal output unit 210, starts counting on the basis of the clock signal output from the clock source 222 and having the clock period T, and outputs to the comparator 216 the number of counts accumulated since the start of the counting.

The comparator 216 compares the number of counts output from the time measurement unit 214 with the number of counts output from the time storage unit 218. Then, if the two values become equal, the comparator 216 outputs an activation signal 220. The activation signal 220 is a signal for notifying the other devices and so forth that the power supply to the first circuit 111, the second circuit 121, and so forth has been started. The signal can notify a clock supply unit that each of the blocks has been activated, for example, to thereby start the supply of the clock signal to the target block. The output timing of the activation signal 220 is not limited to the timing at which the number of counts output from the time measurement unit 214 becomes equal to the number of counts output from the time storage unit 218. Thus, the output timing may be set to the timing at which the difference between the two numbers of counts becomes a predetermined value.

Figure 3A:
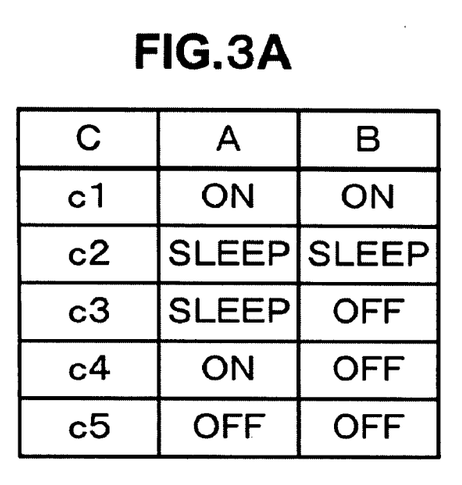
FIGS. 3A to 3C show truth value tables of operation modes.
Figure 3B:
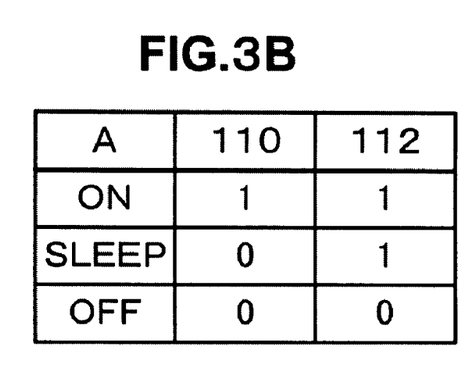
Figure 3C:
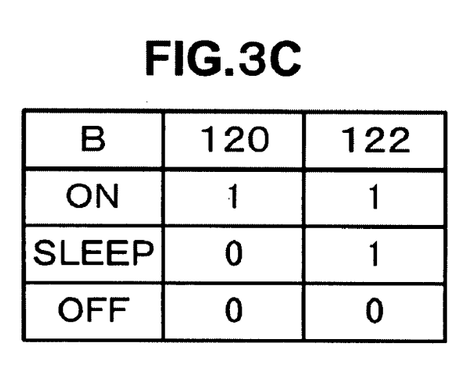

Each of FIGS. 3A to 3C represents the relationship between the operation mode and the switch control signal 132a, 132b, 132c, and 132d. FIG. 3A represents the relationship between the operation mode of the semiconductor device and the operation mode of each of the blocks. FIG. 3B represents the relationship between the operation mode of the block 103 and the operational state of each of the switches included in the block, and FIG. 3C represents the relationship between the operation mode of the block 104 and the operational state of each of the switches included in the block. The table of FIG. 3A is stored in the decoder 213. The decoder 213 decodes the input signal in accordance with FIG. 3A. A column C represents the operation mode signals input to the decoder 213. Columns A and B represent the operation mode signals of the blocks 103 and 104, respectively. In FIG. 3A, the operation mode ON represents the state in which the switch connected in series to the circuit and the switch connected in series to the capacitive element are both in the ON state. The operation mode SLEEP represents the state in which only the switch connected in series to the capacitive element is in the ON state. The operation mode OFF represents the state in which the two switches are both in the OFF state.

The tables of FIGS. 3B and 3C are stored in the signal output unit 210. On the basis of the decoded signal output from the decoder 213, the signal output unit 210 outputs the switch control signals 132a, 132b, 132c, and 132d. Columns A and B represent the operation mode signals input to the signal output unit 210 for the blocks 103 and 104, respectively. Columns 110, 112, 120, and 122 represent the switch control signals 132a, 132b, 132c, and 132d to be transmitted to the switches 110, 112, 120, and 122, respectively. In the present embodiment, "1" represents the ON state, and "0" represents the OFF state.

For example, if the operation mode stored in the state storage unit 212 is c1, the decoder 213 decodes the operation mode signal c1 to set both of the blocks 103 and 104 in the operation mode ON. The decoded operation mode signal is output to the signal output unit 210. On the basis of the input operation mode signal and FIGS. 3B and 3C, the signal output unit 210 outputs the switch control signals 132a, 132b, 132c, and 132d corresponding to the operation mode ON of each of the blocks. Specifically, the signal output unit 210 outputs to each of the switches 110, 112, 120, and 122 the switch control signal 132a, 132b, 132c, and 132d having a logical value "1" for turning on all of the switches.

Figure 4:
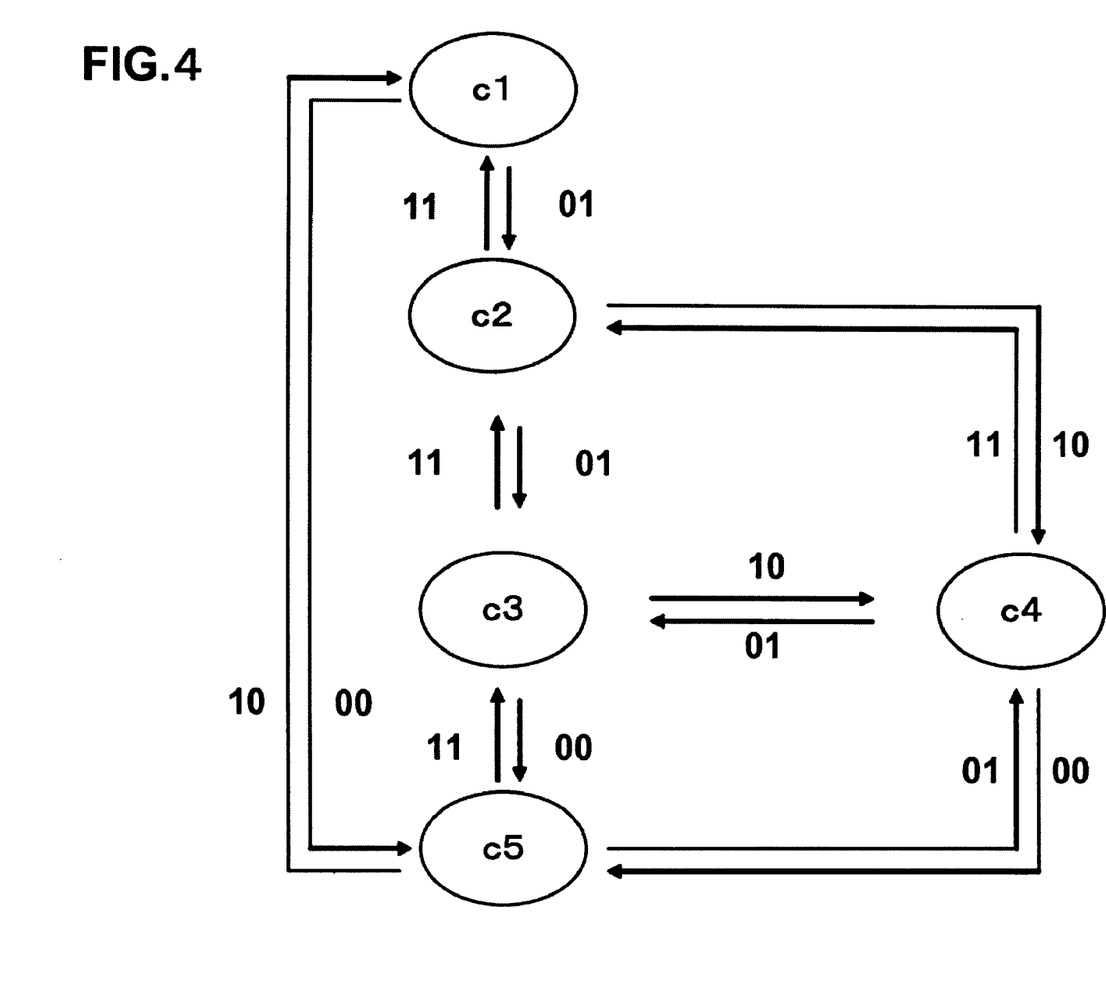
FIG. 4 shows a state transition diagram.

FIG. 4 is a state transition diagram illustrating a state transition in accordance with the current operation mode and the input state transition signal 133. The condition of the state transition of FIG. 4 is stored in the mode determination unit 211 of FIG. 2. In the drawing, c1 to c5 represent the operation modes, which are equal to the operation modes of the column C in FIG. 3A. If the number of transition paths is increased, the processing by the mode determination unit 211 becomes complicated. However, if the degree of freedom of mode transition is increased, a less redundant switch control can be performed.

A two-digit number accompanying each of arrows located between the respective operation modes represents the state transition signal 133 input from the microcomputer 200. For example, if the current operation mode is c3, and if the input state transition signal 133 is "11," the current operation mode c3 transits to the operation mode c2. If the input state transition signal 133 is "00," the current operation mode c3 transits to the operation mode c5. If the input state transition signal 133 is "10," the current operation mode c3 transits to the operation mode c4. In the above-described manner, the next operation mode can be determined on the basis of the current operation mode and the input state transition signal 133.

The operation modes c1 to c5 represent the operation mode of the entire semiconductor device. Meanwhile, the operation mode of each of the blocks can be defined on the basis of FIG. 3A. For example, if the operation mode transits from c1 to c2, the operation mode of the block 103 transits from ON to SLEEP. Similarly, the operation mode of the block 104 also transits from ON to SLEEP. Meanwhile, if the operation mode transits from c2 to c3, the operation mode of the block 103 is unchanged, and the operation mode of the block 104 transits from SLEEP to OFF. As described above, a plurality of operation modes are provided for the entire semiconductor device, and each of the operation modes is assigned with the operation modes of the respective blocks. Accordingly, it is possible to separately control the operation modes of the respective blocks while reducing the capacity required to store the operation modes.

Figure 5:
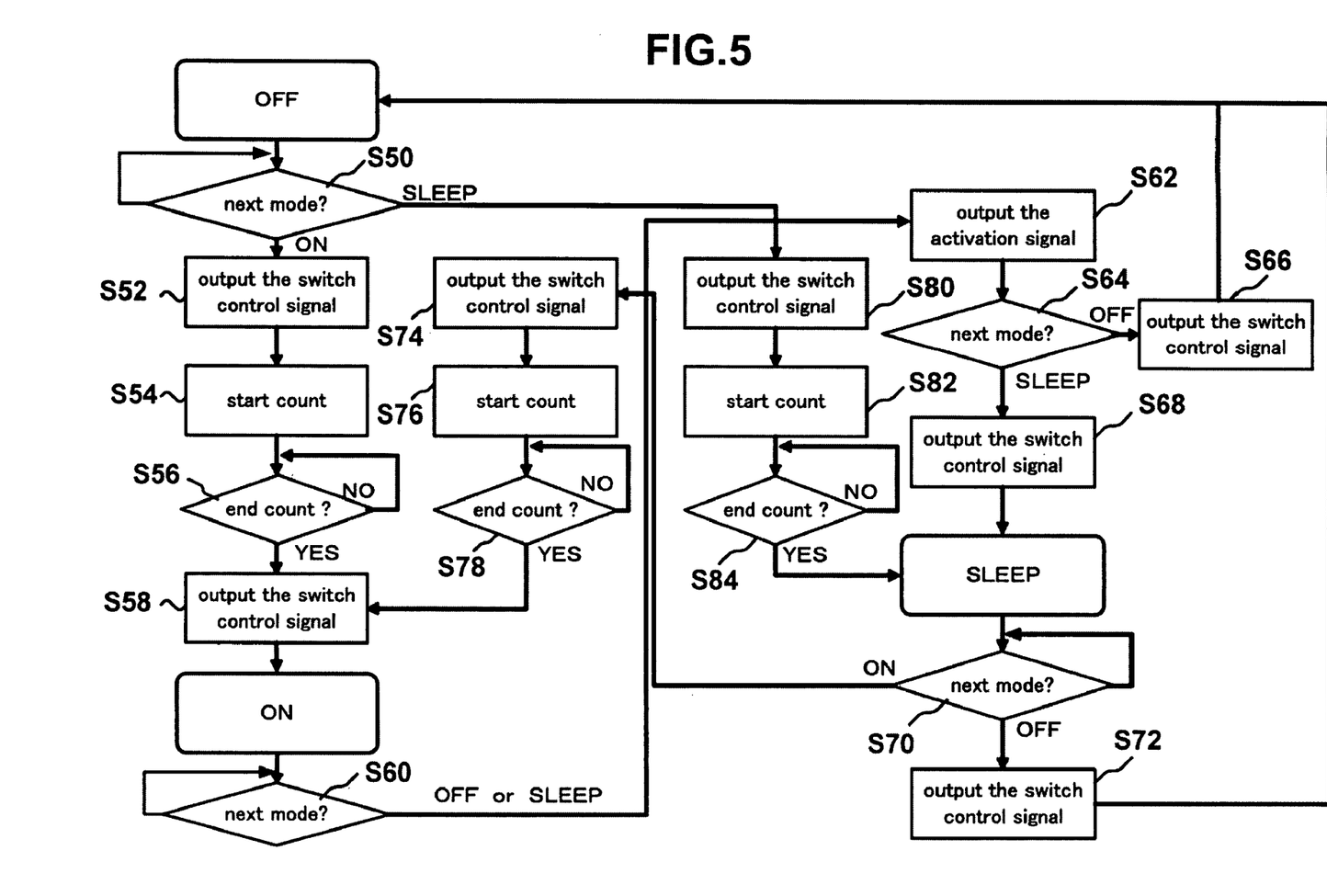
FIG. 5 shows an operational flowchart.

FIG. 5 is a flowchart illustrating a transition process of the operation mode performed in each of the blocks on the basis of the state transition signals 133 of FIG. 4. The operation modes ON, SLEEP, and OFF of FIG. 5 are the same as the operation modes ON, SLEEP, and OFF of FIGS. 3A to 3C. The blocks 103 and 104 perform the same operation on the basis of the flowchart of FIG. 5. Herein, description will be made of the state transition process of the block 103, as an example.

At Step S50, the switch controller 131 performs a process of determining the next operation mode on the basis of the input state transition signal 133. It is now assumed that the state storage unit 212 stores the information that the current operation mode is c5. Further, it is assumed that "10" has been input as the state transition signal 133. In this case, on the basis of the state transition signal 133 and the current operation mode c5, the mode determination unit 211 determines from the state transition diagram of FIG. 4 that the next operation mode is c1. The operation mode c1 is written in the state storage unit 212, and the switch controller 131 performs the process of Step S52.

At Step S52, on the basis of the operation mode c1 stored in the state storage unit 212 and the truth value table of FIG. 3A, the decoder 213 outputs a mode signal to the signal output unit 210 to set the block 103 in the operation mode ON. On the basis of FIG. 3B, the signal output unit 210 outputs a switch control signal for turning on the switch 110 connected to the first circuit 111 and the switch 112 connected to the capacitive element 113.

At Step S54, the signal output unit 210 outputs a switch control signal to the time measurement unit 214 to start counting the time until the charging of the capacitive element 113 is completed. At Step S56, the comparator 216 compares the number of counts output from the time measurement unit 214 with the value stored in the time storage unit 218. If the two values become equal, the comparator 216 completes the counting process and outputs the activation signal 220 at Step S58. Thereby, the block 103 is set in the operation mode ON.

Meanwhile, if "11" is input as the state transition signal 133, the mode determination unit 211 determines from the state transition diagram of FIG. 4 that the next operation mode is c3. The operation mode c3 is written in the state storage unit 212, and the switch controller 131 performs the process of Step S80.

At Step S80, on the basis of the operation mode c3 stored in the state storage unit 212, the decoder 213 outputs a mode signal to the signal output unit 210 to set the block 103 in the operation mode SLEEP. The signal output unit 210 performs a process of outputting a signal for turning on the switch 112 connected to the capacitive element 113. At Step S82, the signal output unit 210 outputs a signal to the time measurement unit 214 to start counting the time until the charging of the capacitive element 113 is completed. At Step S84, the comparator 216 compares the number of counts output from the time measurement unit 214 with the value stored in the time storage unit 218. Then, if the two values become equal, the comparator 216 completes the counting process. The comparator 216 then outputs, as the activation signal 220, the information that the charging of the capacitive element 113 has been completed. Thereby, the block 103 is set in the operation mode SLEEP.

At Step S60, the mode determination unit 211 remains in the standby state until the input of the state transition signal 133. At Step S62, upon input of the state transition signal 133 to the mode determination unit 211, the comparator 216 outputs, as the activation signal 220, the information that the block 103 is no longer in the operation mode ON.

At Step S64, the mode determination unit 211 determines the next operation mode on the basis of the input state transition signal 133 and the current operation mode stored in the state storage unit 212. If the state transition signal 133 is "00," the mode determination unit 211 determines that the next operation mode is c5. Then, the mode determination unit 211 outputs the operation mode c5 to the state storage unit 212.

At Step S66, the switch controller 131 outputs a switch control signal for turning off the switch 110 connected to the first circuit 111 and the switch 112 connected to the capacitive element 113. Thereby, the block 103 is set in the operation mode OFF.

Meanwhile, at Step S64, if "01" is input as the state transition signal 133, the mode determination unit 211 determines the next operation mode as c2. At Step S68, the mode determination unit 211 outputs the operation mode c2 signal to the state storage unit 212. Further, at Step S68, the switch controller 131 outputs a signal for turning off the switch 110 connected to the first circuit 111. Thereby, the operation mode of the block 103 is set in SLEEP.

At Step S70, the mode determination unit 211 remains in the standby state until the input of the state transition signal 133. The state storage unit 212 stores the operation mode c2. If the state transition signal 133 is "11," the mode determination unit 211 determines that the next operation mode is c1. At Step S70, the mode determination unit 211 determines the next operation mode as c1, and outputs the operation mode c1 to the state storage unit 212. Then, the switch controller 131 proceeds to the process of Step S74.

At Step S74, the signal output unit 210 outputs a switch control signal for turning on the switch 110 connected to the first circuit 111. At Step S76, the signal output unit 210 instructs the time measurement unit 214 to start counting to determine whether the parasitic capacitance of the first circuit 111 has been charged. At Step S78, on the basis of the number of counts output from the time measurement unit 214 and the number of counts output from the time storage unit 218, the comparator 216 determines whether the parasitic capacitance of the first circuit 111 has been charged. At Step S58, the comparator 216 outputs the activation signal 220. Thereby, the operation mode of the block 103 is set in ON.

Meanwhile, if "01" is input as the state transition signal 133 at Step S70, the mode determination unit 211 determines the next operation mode as c3. Thus, the operation mode of the block 103 remains in SLEEP. If "00" is further input as the state transition signal 133, the mode determination unit 211 determines the next operation mode as c5. Then, the switch controller 131 proceeds to the process of Step S72.

At Step S72, the signal output unit 210 outputs a switch control signal for turning off the switch 112. Thereby, the operation mode of the block 103 is set in OFF.

If a switch connected to a capacitive element is turned off, the capacitive element maintains the charged state for a short time. After the lapse of a long time, however, the capacitive element is discharged due to a parasitic resistance of the capacitive element and so forth. Thus, the operation mode SLEEP is provided in the transition of the operation mode from OFF to ON. Thereby, the capacitive element connected in parallel to a circuit is recharged before the start of the power supply to the circuit. Accordingly, it is possible to suppress a drop in the power supply voltage occurring when the circuit is connected to the power supply, and to activate the circuit at high speed.

Figure 6:
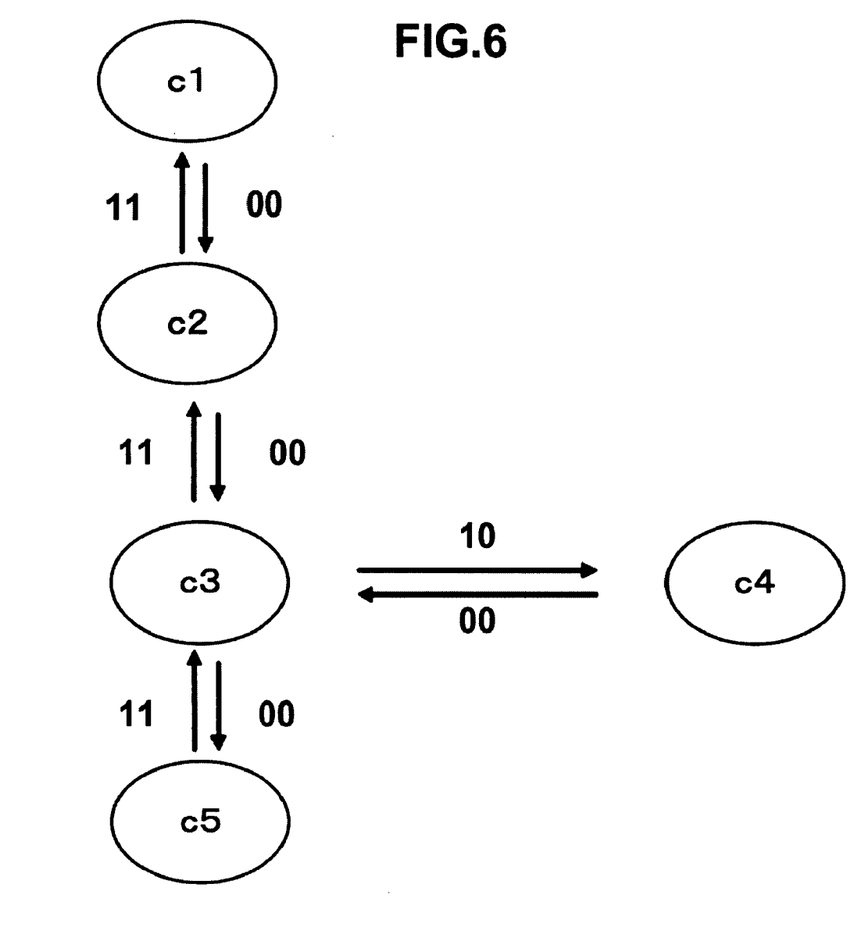
FIG. 6 shows a state transition diagram.

FIG. 6 is a state transition diagram illustrating a state transition in accordance with the current operation mode and the input state transition signal 133. In the drawing, c1 to c5 represent the operation modes, which are equal to the operation modes of the semiconductor device in FIG. 3A. The present example includes a smaller number of transition paths than in the state transition diagram of FIG. 4. Thus, the circuit operation becomes redundant. However, the circuit size of the switch controller 131 can be reduced.

A two-digit number accompanying each of arrows located between the respective operation modes represents the input state transition signal 133. For example, if the current operation mode is c3, and if the input state transition signal 133 is "11," the current operation mode c3 transits to the operation mode c2. If the input state transition signal 133 is "00," the current operation mode c3 transits to the operation mode c5. If the input state transition signal 133 is "10," the current operation mode c3 transits to the operation mode c4. In the above-described manner, the next operation mode can be determined on the basis of the current operation mode and the input state transition signal 133.

The operation modes c1 to c5 represent the operation mode of the entire semiconductor device. Meanwhile, the operation mode of each of the blocks can be defined on the basis of FIG. 3A. For example, if the operation mode transits from c1 to c2, the operation mode of the block 103 transits from ON to SLEEP. Similarly, the operation mode of the block 104 also transits from ON to SLEEP. Meanwhile, if the operation mode transits from c2 to c3, the operation mode of the block 103 is unchanged, and the operation mode of the block 104 transits from SLEEP to OFF. As described above, a plurality of operation modes are provided for the entire semiconductor device, and each of the operation modes is assigned with the operation modes of the respective blocks. Accordingly, the operation modes of the respective blocks can be separately controlled.

Figure 7:
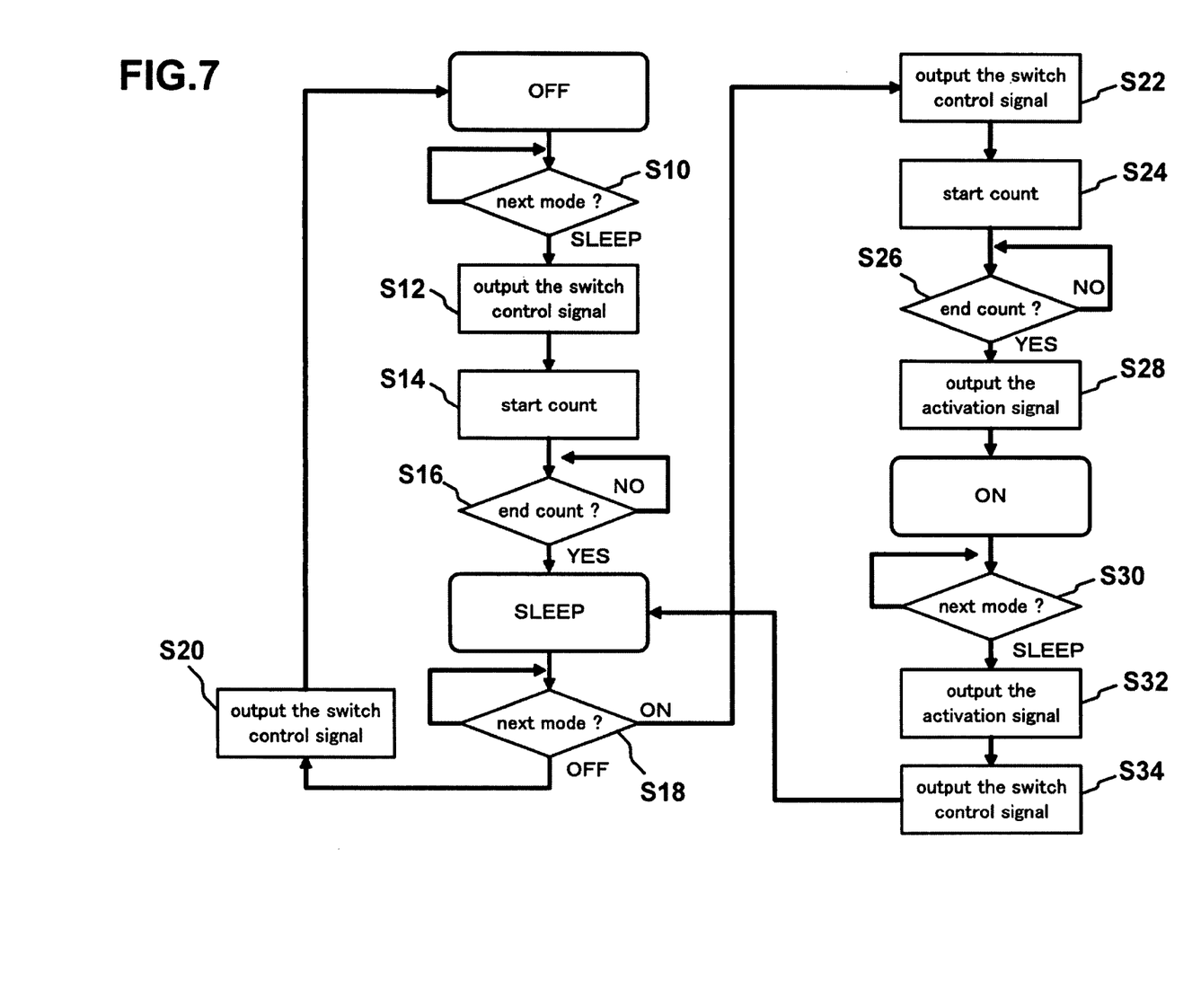
FIG. 7 shows an operational flowchart.

FIG. 7 is a flowchart illustrating a transition process of the operation mode performed in each of the blocks on the basis of the state transition signals 133 of FIG. 6. The operation modes ON, SLEEP, and OFF of FIG. 7 are the same as the operation modes ON, SLEEP, and OFF of FIGS. 3A to 3C. The blocks 103 and 104 perform the same operation on the basis of the flowchart of FIG. 7. Herein, description will be made of the state transition process of the block 103, as an example.

At Step S10, the mode determination unit 211 remains in the standby state until the input of the state transition signal 133. It is now assumed that the state storage unit 212 stores the operation mode c5. At Step S10, on the basis of "11" input as the state transition signal 133 and the operation mode c5 stored in the state storage unit 212, the mode determination unit 211 determines that the next operation mode is c3.

At Step S12, the signal output unit 210 outputs a switch control signal 132b for turning on the switch 112. At Step S14, the signal output unit 210 outputs a signal for instructing the time measurement unit 214 to start counting. At Step S16, the comparator 216 compares the number of counts output from the time measurement unit 214 with the number of counts output from the time storage unit 218. Then, if the two values become equal, the comparator 216 outputs the activation signal 220.

At Step S18, the mode determination unit 211 is in the standby state. The operation mode stored in the state storage unit 212 is c3. If "00" is input as the state transition signal 133, the mode determination unit 211 determines the next operation mode as c5. Then, the mode determination unit 211 stores the operation mode c5 in the state storage unit 212, and the procedure proceeds to Step S20. Meanwhile, if "10" is input, the mode determination unit 211 determines the next operation mode as c4. Then, the mode determination unit 211 stores the operation mode c4 in the state storage unit 212, and the procedure proceeds to Step S22. At Step S20, the signal output unit 210 outputs a signal for turning off the switch 112.

At Step S22, the signal output unit 210 outputs a switch control signal 132a for turning on the switch 110. At Step S24, the signal output unit 210 outputs the count start signal 230 to the time measurement unit 214. At Step S26, the comparator 216 compares the number of counts output from the time measurement unit 214 with the time required to charge the parasitic capacitance of the first circuit 111, which is stored in the time storage unit 218. Then, if the two values become equal, the comparator 216 outputs the activation signal 220 at Step S28.

At Step S30, the mode determination unit 211 is in the standby state. The state storage unit 212 stores c4 as the operation mode. If "00" is input as the state transition signal 133, the mode determination unit 211 determines the next operation mode as c3. Then, the mode determination unit 211 stores the operation mode c3 in the state storage unit 212. At Step S32, the comparator 216 outputs, as the activation signal 220, the information that the first circuit 111 is to be brought into the stopped state. At Step S34, the signal output unit 210 outputs a signal for turning off the switch 110.

If a switch connected to a capacitive element is turned off, the capacitive element maintains the charged state for a short time. After the lapse of a long time, however, the capacitive element is discharged due to a parasitic resistance of the capacitive element and so forth. Thus, the operation mode SLEEP is provided in the transition of the operation mode from OFF to ON. Thereby, the capacitive element connected in parallel to a circuit is recharged before the start of the power supply to the circuit. Accordingly, it is possible to suppress a drop in the power supply voltage occurring when the circuit is connected to the power supply, and to activate the circuit at high speed.

What is claimed is:

1. An electric circuit device operable under a power supply comprising:
    a circuit;
    a first switch connected between the power supply and the circuit;
    a capacitor tending to produce a first leakage current;
    a second switch connected between the power supply and the capacitor, the second switch producing a second leakage current when it is cut off, the second leakage current being less than the first leakage current; and
    a switch controller for turning on the second switch after both the first switch and the second switch are turned off, and for turning on the first switch after a first time passes after turning on the second switch,
    wherein the first time is not less than the time constant determined by the product of the capacitance of the capacitor and the on-resistance of the second switch.

2. An electric circuit device operable under a power supply comprising:
    a circuit;
    a first switch connected between the power supply and the circuit;
    a capacitor tending to produce a first leakage current;
    a second switch connected between the power supply and the capacitor, the second switch producing a second leakage current when it is cut off, the second leakage current being less than the first leakage current; and
    a switch controller for turning on the second switch after both the first switch and the second switch are turned off, and for turning on the first switch after a first time passes after turning on the second switch,
    wherein the switch controller comprises:
    a time storage unit for storing first time information in accordance with the first time;
    a time measurement unit for detecting second time information in accordance with the elapsed time after the second switch turns on; and
    a comparator for outputting an activation signal when the first time information equals the elapsed time information.

3. The electric circuit device according to claim 2, wherein the first time information is the first time divided by the clock cycle, and the second time information is the number of clock periods after the second switch turns on.

4. The electric circuit device according to claim 2, further comprising a state storage unit for storing operation modes of the first switch and second switch, wherein the time storage unit outputs the first time information in accordance with the operation mode.

5. The electric circuit device according to claim 4, further comprising a mode determination unit for determining an operation mode following a present mode in accordance with an inputted state transition signal for indicating a next state and an operation mode stored in the state storage unit.

6. A method of controlling an electric circuit device operable under a power supply, the electric circuit device including a first switch connected between the power supply and a circuit and a second switch connected between the power supply and a capacitor, the method comprising:
    turning on the second switch after both the first switch and the second switch are turned off; and
    turning on the first switch after a first time passes after turning on the second switch,
    wherein the first time is not less than the time constant determined by the product of the capacitance of the capacitor and the on-resistance.

* * * * *